Sept. 22, 1970    M. A. WEST    3,529,409
COTTON PICKER COMPRESSOR ASSEMBLY
Filed Nov. 20, 1968    2 Sheets-Sheet 1

INVENTOR
MACK A. WEST
BY *Townshend & Mesrole*
ATTORNEYS.

Sept. 22, 1970  M. A. WEST  3,529,409
COTTON PICKER COMPRESSOR ASSEMBLY
Filed Nov. 20, 1968  2 Sheets-Sheet 2

INVENTOR
MACK A. WEST
BY Townshend & Meserole
ATTORNEYS.

United States Patent Office 3,529,409
Patented Sept. 22, 1970

3,529,409
COTTON PICKER COMPRESSOR ASSEMBLY
Mack A. West, P.O. Box 101, Paragould, Ark. 72450
Filed Nov. 20, 1968, Ser. No. 777,404
Int. Cl. A01d 45/18
U.S. Cl. 56—44                                   7 Claims

ABSTRACT OF THE DISCLOSURE

A compressor assembly for guiding the foliage of cotton plants between and into engagement with vertical banks of picker spindles in a cotton picker machine is constituted as a series of separate panels arranged in a vertical bank parallel to the bank of spindles with which they are associated. Each panel is separately spring-biased to guide and press the plant foliage horizontally into engagement with the picker spindles at its level; is individually movable to various selective positions of adjustment relative to the spindles; and carries means selectively adjustable to determine the extent to which the plant foliage guided by the panel is forced horizontally into engagement with the spindles.

CROSS-REFERENCE

This application is companion to my U.S. Pat. 3,406,507 of Oct. 22, 1968.

BACKGROUND OF THE INVENTION

Field

The present invention relates in general to harvesters and in particular to cotton pickers of the type disclosed in U.S. Patent to Nickla et al., 3,169,359. Cotton pickers of this type are equipped with verticaly disposed compressor sheets which guide the plants laterally into engagement with vertical banks of rotating picker spindles that engage and pull cotton from open bolls. In general, the compressor sheets are spring-loaded and arranged so that they have vertical face contact with the plant foliage in planes parallel to the vertical axes of the drums which carry the sets of picker spindles.

As cotton matures, the bolls of a plant open first from the ground to about half-way up the height of the stalk, before the upper bolls open. If this first open cotton is to be harvested before the upper bolls open the compressor sheets are adjusted so that they press tightly inward from each side against the plant foliage and force the open bolls against the picker spindles.

Prior art

The most pertinent prior art is epitomized in aforesaid Pat. 3,169,359, in which each compressor sheet comprises a one-piece front section and a one-piece rear section pivotally connected to the trailing edge of the front section on a vertical axis. Because the sections are solid one-piece sheets they are devoid of flexibility. In consequence, when they are tightened inwardly against the plant foliage they bear with equal pressure against both the upper and lower portions of the foliage. The result of such uniform compression is that many unopened bolls in the upper portion of the foliage are stripped from the plant and lost, thus lowering the ultimate yield of the crop. If the compressor sheets are adjusted so that they bear only lightly on the upper portion of the foliage, then the resultant lighter pressure of the sheets against the lower portion of the foliage results in less picking of the open boles, dropping cotton and stringing it out on the stalks, again lowering the crop yield.

SUMMARY

The present invention avoids the aforesaid disadvantages of the prior art by substituting for the conventional rigid vertical compressor sheet a vertical bank of separate, superposed compressor panel units corresponding in number and height to a conventional bank of rotary picker spindle sets with which they cooperate. Each compressor panel unit is individually adjustable horizontally to selected positions of projection or retraction relative to the plant passage, and is spring-biased to projected position, so that the bank of individual compressor panels is self-conforming to the shape of plants they may engage.

The present invention further provides detachable guide means selectively adjustable on each compressor panel unit to different positions of plant-engagement supplemental to the plant-engagement position of the panel to which it is attached.

DRAWINGS

DESCRIPTION

Figure 1:
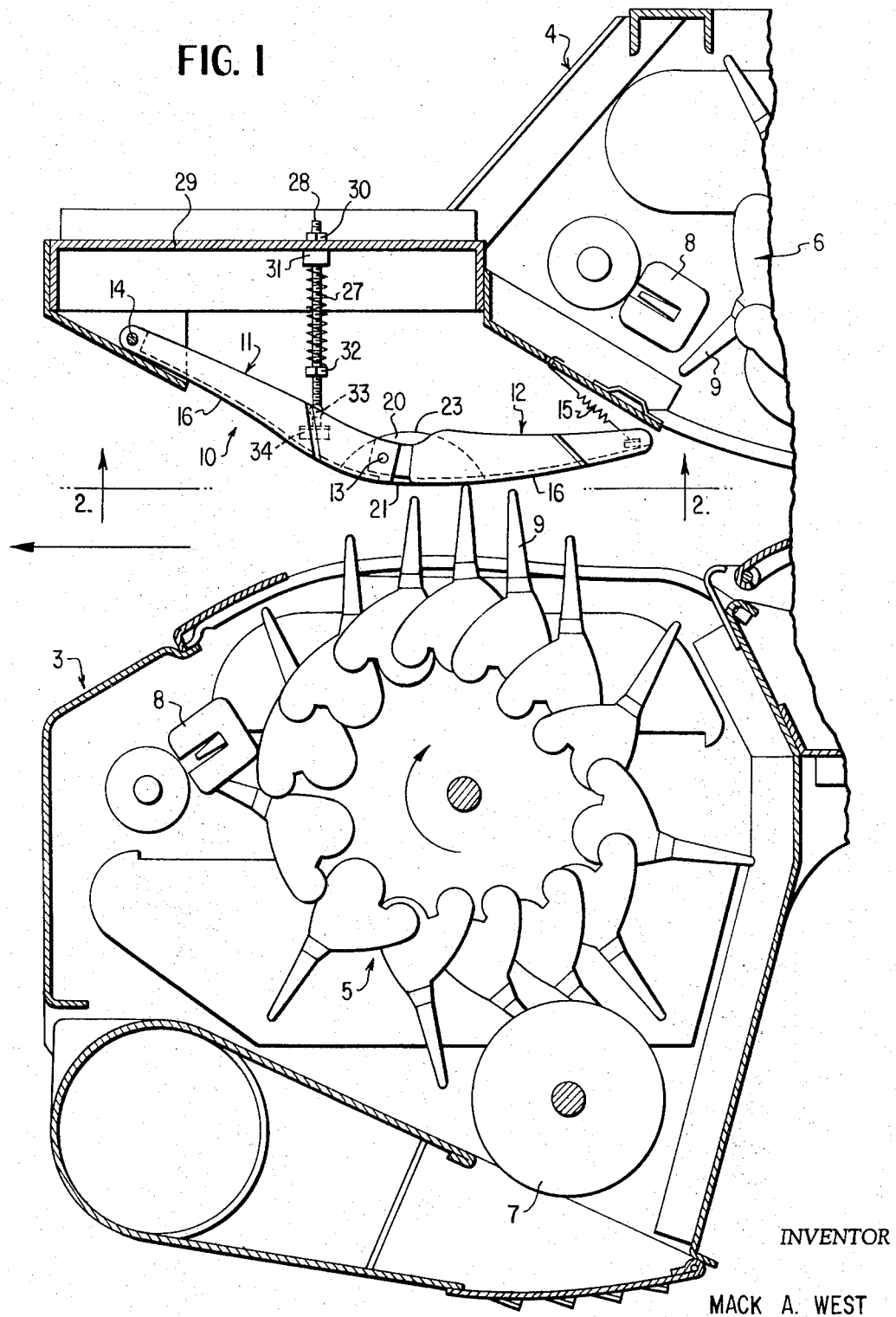
FIG. 1 is substantially a fragmentary sectional view taken horizontally through the forepart of a cotton picker machine similar to the picker shown in the aforesaid Nickla et al. Pat. 3,169,359 but equipped with the compressor panel assembly of the present invention.

The present invention is shown as applied to a cotton picker of the type disclosed in my U.S. Pat. No. 3,406,-507 hereinbefore noted, and has a pair of left and right counterpart frame portions 3 and 4 which, respectively, house vertical rotary picker drums 5 and 6, doffing mechanism 7, and spindle moistener means 8. The drums mount stacks of vertically spaced sets of horizontal picker spindles 9 which rotate on their individual axes to wind the cotton and pluck it from the bolls as the machine advances along a row of cotton plants.

My invention particularly concerns the means by which the cotton bolls are guided and pressed into engagement with the spindles. In the embodiment herein disclosed, the leading (right hand) compressor assembly is constituted as a vertical series of separate presser panel units 10 each having a front section 11 and a rear section 12 pivotally connected to the front section by a vertical axis pivot pin 13. The front ends of all the front sections 11 are pivoted on a vertical shaft 14 carried by the machine frame at the location shown in FIG. 1. The rear end of each rear section 12 is rounded and is connected by a contraction spring 15 to a fixed element of the machine frame, so that the rounded end is spring-biased against the frame element to fulcrum loosely thereon.

The number of compressor panel units 10 equals the number of picker spindle sets on the vertical drum with which they are associated. Each panel section is a channel bar disposed horizontally in the assembly in such manner that its web 16 connecting its top and bottom side walls 17 and 18, respectively, lies in a vertical plane and provides its outer or front plant foliage-engaging face. The top and bottom side walls of each channel bar section extend horizontally inward in parallel relation. Grease gun fittings 19 are provided for the respective pivotal connections between the pivot pins 13 and the pivot shaft 14.

Each panel unit 10 is so arranged that its opposite horizontal set of picker spindles would, if geometrically projected, engage the panel web 16 of its rear section 12 intermediate its top and bottom edges.

Figure 3:
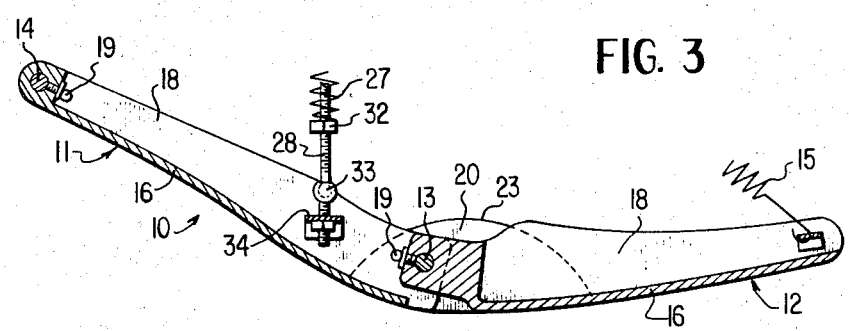
FIG. 3 is a sectional view on line 3—3 of FIG. 2.

A salient feature of the present invention is the means carried by each panel for selectively effecting localized lateral extension of its plant foliage-engageable surface. This means comprises, for each panel unit assembly 10, a supplemental presser plate 20 having a pair of opposite side edges contoured in arcs of different curvature. The curvature of one edge 21, is such that when the plate is secured to the exterior of the bottom wall 18 of its associated section 12, in the position shown in FIGS. 1, 3 and 5, by a pair of detachable fastening elements 22, the edge 21 is substantially flush with the overlying edges of the panel sections 11 and 12. The curvature of the other edge, 23, is such that when the plate 20 is disposed in the position shown in FIG. 6 it is projected laterally from the outer face of its panel assembly so that its then outer edge 23 will pass between adjacent upper and lower spindles into aggressive engagement with the plant foliage; thereby pressing the adjacent bolls into engagement with the picker spindles over the full length of the spindles and without affecting the adjusted pressure setting of any other panel unit assembly.

The extension plate 20 of each compressor panel unit 10 is detachably secured to one of its sections, but not to the other, in such position that it bridges the ends of the sections over the area proximate their connecting pivot pin 13 and overlaps the end portions of the sections. As here shown, the plate is secured to the under face of the bottom wall 18 of the rear section 12 by a pair of fastening elements 22. In this embodiment of my invention the elements 22 are bolts disposed through appropriate holes in the body of the plate which overlaps the contiguous leading end portion of the rear sections 12. A similar pair of holes 24 is provided in that portion of the body of the plate which overlaps the trailing end portion of the front section 11 in slidable relation therewith.

Figure 5:
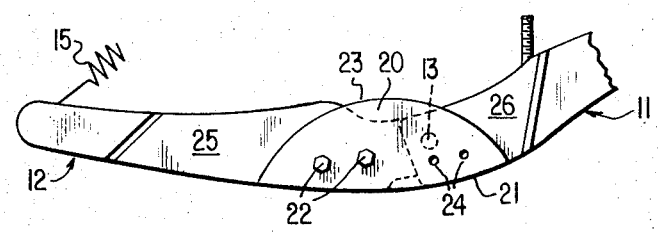
FIG. 5 is a fragmentary bottom elevation of a panel illustrating one position of a penetration depth control plate forming an element of my invention.
Figure 6:
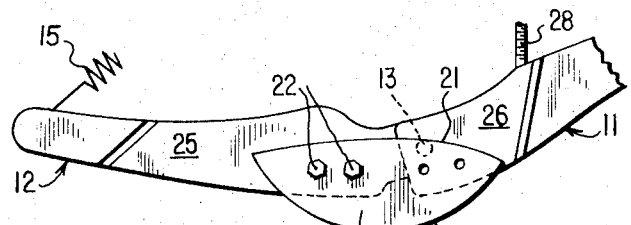
FIG. 6 is a view similar to FIG. 5 but illustrating a different position of the plate.

When the plate 20 is to be adjusted from its retracted FIG. 5 position to its extended FIG. 6 position the fastening elements 22 are removed, the plate is positioned to bring the holes 24 in position to receive the fastening elements with the edge 23 extended in its FIG. 6 position, and the fastening elements are reattached.

Figure 2:
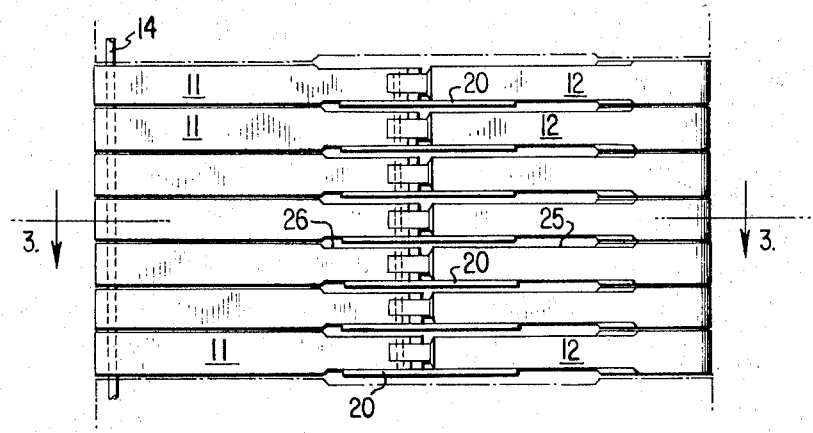
FIG. 2 is a fragmentary outer side elevation of the panel assembly as viewed from line 2—2 of FIG. 1.
Figure 4:
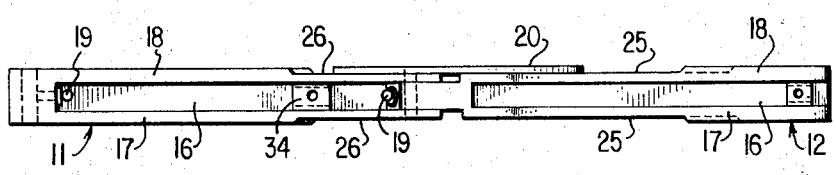
FIG. 4 is an inner side elevation of the panel in FIG. 3 rotated forwardly ninety degrees from the plane of the sheet.

As best shown in FIGS. 2 and 4, the outer faces of the top and bottom side walls 17 and 18 of each compressor panel section are formed with depressed areas extending oppositely and longitudinally from their pivot pins 13. In each panel unit assembly the depressed face areas 25 of its rear section 12 are of greater longitudinal extent than the depressed areas 26 of its front section 11. The combined depressed areas provide ample clearance spaces for the plates 20 when the panel units are disposed in their service relation as shown in FIG. 2. These clearance spaces serve another purpose, as will hereinafter be explained.

Each compressor panel assembly unit 10 is spring biased towards the plant guide passage and the opposite bank of picker spindles by means of an expansion spring 27 coiled on the screw-threaded shank of an adjustment rod 28. This rod is disposed horizontally within the casing that houses the compressor panel assembly and is slidable axially through the exterior wall 29 of the casing. The exterior end portion of the rod projects outwardly beyond the casing wall and is threaded to receive an adjusting nut 30 which determines selectively a limit to which the rod 28 may move axially in the direction of the plant passage. The rod 28 is slidable axially through a bearing block or plate 31 which seats against the inner face of the casing wall 29. The spring 27 bears at one end against the block 31 and at its other end against a tension adjusting nut 32 threaded on rod 28. Adjacent the front section 11 of the panel the rod 28 has a ball and socket pivotal connection 33 with a fixed anchorage 34 on the wall 18 of the section.

OPERATION

As the compressor panel assemblies for the machine portions 3 and 4 are the same, the following description in regard to the assembly in the right hand portion 4 will suffice for both. As shown in FIG. 2, the compressor panel units 10 are mounted in closely superposed relation with the leading ends of their front sections 11 pivoting in the vertical shaft 14. The plates 20, attached to the bottom faces of the rear sections 12, are housed within the clearance spaces provided by the depressed areas 25 and 26 of the respective sections, and their edges 21 are adjacent the plant passage. The panel unit webs 16, in conjunction with the plate edges 21, have the plant-guiding effect of a single compressor sheet such as that indicated by the general reference character 10 in my aforesaid Pat. 3,406,507.

The individual compressor panel units 10 are adjusted to a setting conforming to the foliage spread of the plants at their respective height levels. The adjustment rod 28 of each panel unit is set so that it section webs 16 will engage the plant foliage at the height of the panel, and with a pressure determined by tension adjustment of its spring 27. It is possible by such adjustments to confine the picking and plucking action of the spindles to a selected height zone of the plants without detrimental effect on cotton bolls which may not at the time of harvesting be ready for picking.

The function of the compressor panels is to guide and force the plant foliage yieldingly into contact with the picker spindles while the machine is in operation. In some instances it may be desirable to increase the aggressive action of one or more of the panel units; in which case the supplemental presser plate 20 of a panel unit involved is detached from its normal FIG. 3 retracted position of attachment to its associated rear section 12 and is turned end for end for reattachment with its edge 23 projected into the plant passage as shown in FIG. 6. When the plate is in this position it extends horizontally into the bank of picker spindles midway between the adjacent upper and lower sets.

It is apparent that the plate 20 of each panel unit, regardless of its service position, lies in the clearance space provided by the depressed areas 25 and 26 in the bottom faces of the sections to which it is attached and the depressed areas 25 and 26 in the top faces of the subjacent panel sections. The disposition of the plate 20 is such that the apogee of each of its curved edges 21 and 23 lies in the depressed area 25 in the rear section 12 of the panel to which it is attached. Each depressed area 25 extends longitudinally from the leading end of its panel section 12 to a point close to the connection with its rear end biasing spring 15. This arrangement makes possible adaptation of the bank of compressor panels to the use of pressure means operative independently of the panel units 10 and horizontally through the clearance spaces provided by the depressed areas 25, simply by removing the plates 20. With these plates removed, the clearance spaces between the superposed panel units are free to permit passage of independent plant foliage presser means; for example, the presser discs shown in my aforesaid Pat. 3,406,507.

I claim:

1. In a cotton picker machine having vertical rotary drums carrying horizontal sets of vertically spaced picker spindles; a vertical bank of separate spring biased compressor panel units corresponding in number and height to the spindle sets and defining therewith a plant passage therebetween; and supplemental presser means individual to each compressor panel unit and selectively attachable thereto in different service positions relative to the plant passage.

2. In the structure of claim 1, said supplemental presser means in one service position being adapted to extend horizontally between the upper and lower sets of spindles adjacent thereto.

3. In the structure of claim 1, said compressor panel units each including top and bottom faces provided with depressed areas adapted to seat said supplemental presser means therein.

4. A compressor panel unit for guiding cotton plants into the plant passage of a cotton picker machine, said unit comprising: a front section having a plant-engageable face; a rear section having a plant-engageable face and pivotally connected at its leading end to the trailing end of the front section; and a supplemental presser plate attached to one section for slidable movement relative to the other, said plate being substantially perpendicular to the plant-engageable faces of the sections.

5. In the structure of claim 4, said supplemental presser plate having a pair of opposite side edges of different contours; and said presser plate being adjustably attachable to its panel section for selective presentation of either side edge to the plant passage.

6. In the structure of claim 5, the contour of one side edge of the presser plate being such that, when it is presented to the plant passage, the body of the plate projects laterally from the plant-engageable faces of the sections into the plant passage.

7. In the structure of claim 6, the contour of the other side edge of the presser plate being such that, when it is presented to the plant passage, it is substantially flush with the plant-engageable faces of the panel sections.

References Cited

UNITED STATES PATENTS

| | | | |
|---|---|---|---|
| 3,169,359 | 2/1965 | Nickla et al. | 56—44 |
| 3,336,736 | 8/1967 | Ramsey | 56—47 |
| 3,354,625 | 11/1967 | Taylor et al. | 56—44 |
| 3,406,507 | 10/1968 | West | 56—44 |

RUSSELL R. KINSEY, Primary Examiner